United States Patent
Bazzarella

(10) Patent No.: US 7,311,765 B2
(45) Date of Patent: Dec. 25, 2007

(54) ENERGY AND/OR MASS EXCHANGE APPARATUS HAVING AN INTEGRATED FLUID SEPARATOR

(75) Inventor: Ricardo Bazzarella, Cambridge (CA)

(73) Assignee: Hydrogenics Corporation, Mississauga (CA)

( * ) Notice: Subject to any disclaimer, the term of this patent is extended or adjusted under 35 U.S.C. 154(b) by 313 days.

(21) Appl. No.: 10/925,907

(22) Filed: Aug. 26, 2004

(65) Prior Publication Data

US 2005/0045043 A1    Mar. 3, 2005

Related U.S. Application Data

(60) Provisional application No. 60/497,569, filed on Aug. 26, 2003.

(51) Int. Cl.
*B01D 53/02* (2006.01)
*B01D 45/12* (2006.01)

(52) U.S. Cl. ............ 96/134; 55/385.1; 55/434.2; 55/447; 55/449; 55/456; 261/79.2

(58) Field of Classification Search ........ 429/34, 429/12; 261/115–118, DIG. 15, 79.2, DIG. 65; 96/155, 188, 189, 191, 204, 206, 208, 214, 96/216, 217, 220, 348–350, 360, 355; 55/410, 55/413, 421, 423, 426, 348, 355, 392, 394, 55/396, 397, 399, 447, 449, 450, 456, 457, 55/DIG. 17, 414; 210/512.1

See application file for complete search history.

(56) References Cited

U.S. PATENT DOCUMENTS

| | | | |
|---|---|---|---|
| 1,896,514 A * | 2/1933 | Hoyt | .......................... 237/78 R |
| 1,981,549 A * | 11/1934 | Hawley | ........................ 55/426 |
| 3,173,771 A * | 3/1965 | Barrett et al. | .................. 95/219 |
| 3,724,180 A | 4/1973 | Morton et al. | |
| 3,923,483 A * | 12/1975 | Hilmer et al. | ................ 55/463 |
| 4,384,873 A * | 5/1983 | Herr | ............................ 96/374 |
| 4,509,965 A | 4/1985 | Morton | |
| 4,834,887 A | 5/1989 | Broughton | |
| 5,171,557 A * | 12/1992 | Crosbie et al. | ............. 423/344 |
| 5,431,885 A * | 7/1995 | Zlotnik et al. | .............. 422/122 |
| 5,853,443 A | 12/1998 | Rodgers et al. | |

(Continued)

FOREIGN PATENT DOCUMENTS

DE    2702148 A1    10/2002

(Continued)

*Primary Examiner*—Duane Smith
*Assistant Examiner*—Robert A Clemente
(74) *Attorney, Agent, or Firm*—Bereskin & Parr

(57) ABSTRACT

A liquid separator configured to separate liquid from a fluid stream. The separator includes a housing, a separation chamber disposed within the housing, a drain having a drain passageway for draining liquid from the separation chamber, an inlet chamber configured to receive the fluid stream, an inlet channel configured to communicate the fluid stream from the inlet chamber to the separation chamber, a swirler disposed within the inlet channel, and an outlet channel configured to communicate the fluid stream from a first outlet end positioned proximate the second inlet end, to a second outlet end remote from the separation chamber. Preferably, the separator also includes a separator mounting face proximate the inlet chamber, the mounting face configured for mounting the separator to a humidifier. The housing preferably includes a base and a cap which is removably mountable to the base.

15 Claims, 4 Drawing Sheets

U.S. PATENT DOCUMENTS

| | | | |
|---|---|---|---|
| 6,083,291 A * | 7/2000 | Okada et al. | 55/337 |
| 6,110,246 A * | 8/2000 | Eubank | 55/394 |
| 6,113,675 A * | 9/2000 | Branstetter | 95/261 |
| 6,124,052 A * | 9/2000 | Katoh et al. | 429/33 |
| 6,331,195 B1 | 12/2001 | Faust et al. | |
| 6,540,802 B2 * | 4/2003 | Trautmann et al. | 55/337 |
| 6,579,637 B1 | 6/2003 | Savage et al. | |
| 6,620,217 B2 | 9/2003 | Bruckmann et al. | |
| 6,962,199 B1 * | 11/2005 | Tjeenk Willink | 166/265 |
| 2002/0086194 A1 * | 7/2002 | Blaszczyk et al. | 429/26 |
| 2002/0139096 A1 | 10/2002 | Brilmaker | |

FOREIGN PATENT DOCUMENTS

| | | |
|---|---|---|
| EP | 1 087 888 | 9/2003 |
| JP | 03293009 | 12/1991 |
| JP | 2003001034 | 1/2003 |
| JP | 2003038985 | 2/2003 |

\* cited by examiner

ENERGY AND/OR MASS EXCHANGE APPARATUS HAVING AN INTEGRATED FLUID SEPARATOR

The present application claims priority from U.S. provisional patent application No. 60/497,569, which is incorporated herein by reference in its entirety.

FIELD OF THE INVENTION

The present invention relates generally to the field of fluid separators, with common but by no means exclusive application to electrochemical cell systems.

BACKGROUND OF THE INVENTION

Fuel cells and electrolyzer cells are generally referred to as electrochemical cells. Fuel cells have been proposed as clean, efficient and environmentally friendly power sources that have various applications. A conventional proton exchange membrane (PEM) fuel cell is typically comprised of an anode, a cathode, and a selective electrolytic membrane disposed between the two electrodes.

A fuel cell generates electricity by bringing a fuel gas (typically hydrogen) and an oxidant gas (typically oxygen) respectively to the anode and the cathode. In reaction, a fuel such as hydrogen is oxidized at the anode to form cations (protons) and electrons. The proton exchange membrane facilitates the migration of protons from the anode to the cathode while preventing the electrons from passing through the membrane. As a result, the electrons are forced to flow through an external circuit thus providing an electrical current. At the cathode, oxygen reacts with electrons returned from the electrical circuit to form anions. The anions formed at the cathode react with the protons that have crossed the membrane to form liquid water.

In contrast, an electrolyzer uses electricity to electrolyze water to generate oxygen from its anode and hydrogen from its cathode. Similar to a fuel cell, a typical solid polymer water electrolyzer (SPWE) or proton exchange membrane (PEM) electrolyzer is also comprised of an anode, a cathode and a proton exchange membrane disposed between the two electrodes. Water is introduced to, for example, the anode of the electrolyzer which in turn is connected to the positive pole of a suitable direct current voltage. Oxygen is produced at the anode. The protons then migrate from the anode to the cathode through the membrane. On the cathode which is connected to the negative pole of the direct current voltage, the protons conducted through the membrane are reduced to hydrogen.

In practice, the cells are not operated as single units. Rather, the cells are connected in series, either stacked one on top of the other or placed side by side. The series of cells, referred to as a cell stack, is normally enclosed in a housing. For a fuel cell stack, the fuel and oxidant are directed through manifolds in the housing to the electrodes. The fuel cell is cooled by either the reactants or a cooling medium. The fuel cell stack also comprises current collectors, cell-to-cell seals and insulation while the required piping and instrumentation are provided external to the fuel cell stack. The fuel cell stack, housing and associated hardware constitute a fuel cell module. Likewise, electrolyzer cells are also typically connected in series to form an electrolyzer stack.

A common problem that has to be addressed, for both fuel cell stacks and electrolyzer stacks, is the regulation of water content in the process gas streams. The presence of water in process gas streams typically reduces the efficiency of the electrochemical cell. However, for certain applications, it is advantageous to retain some water content in the gas stream.

There are a variety of devices for exchanging energy and/or mass between at least two fluid streams. Examples of such devices include for example, humidifiers and enthalpy wheels.

Such devices commonly humidify a first gas or fluid stream by transferring humidity from a second fluid stream, also typically containing a gas. In this process, humidity and/or heat from the second fluid stream having higher temperature and higher humidity is retained in the humidifier. The first gas/fluid stream, often having relatively lower humidity and lower temperature flows through the humidifier and picks up the heat and humidity retained therein. In this way, the second gas stream is humidified and heated. This completes the exchange of heat and/or energy between the two streams.

From time to time, liquid water is formed when the second fluid stream loses humidity and heat. The liquid water in the second fluid stream may remain in the second fluid stream, or the liquid water may be retained in the humidifier and picked up by the first fluid stream. In either case, liquid water in the fluid stream may be undesirable.

The inventors have accordingly recognized a need for a fluid separation device for separating liquid from a fluid stream, and adapted for use with humidifiers.

SUMMARY OF THE INVENTION

This invention is directed towards a humidifier integrated with a liquid separator, the separator being configured to separate liquid from a fluid stream.

The separator includes a housing, a separation chamber disposed within the housing, a drain having a drain passageway for draining liquid from the separation chamber, an inlet chamber configured to receive the fluid stream, an inlet channel configured to communicate the fluid stream from the inlet chamber to the separation chamber, a swirler disposed within the inlet channel, and an outlet channel configured to communicate the fluid stream from a first outlet end positioned proximate the second inlet end, to a second outlet end remote from the separation chamber.

The separator also includes a mounting face proximate the inlet chamber, the mounting face configured for mounting the separator to a humidifier.

The housing preferably includes a base and a cap which is removably mountable to the base.

The invention is further directed towards a humidifier integrated with a liquid separator. The separator includes a housing, a separation chamber disposed within the housing, a drain having a drain passageway for draining liquid from the separation chamber, an inlet chamber configured to receive the fluid stream, a mounting face proximate the inlet chamber, an inlet channel configured to communicate the fluid stream from the inlet chamber to the separation chamber, a swirler disposed within the inlet channel, and an outlet channel configured to communicate the fluid stream from a first outlet end positioned proximate the separation chamber, to a second outlet end remote from the separation chamber. The humidifier includes a humidifier inlet, a humidifier outlet, an end face proximate the humidifier outlet, wherein the end face is configured to mate with the separator mounting face. The end face is mated with the separator mounting face.

BRIEF DESCRIPTION OF THE DRAWINGS

The present invention will now be described, by way of example only, with reference to the following drawings, in which like reference numerals refer to like parts and in which.

DETAILED DESCRIPTION OF THE INVENTION

Figure 1:
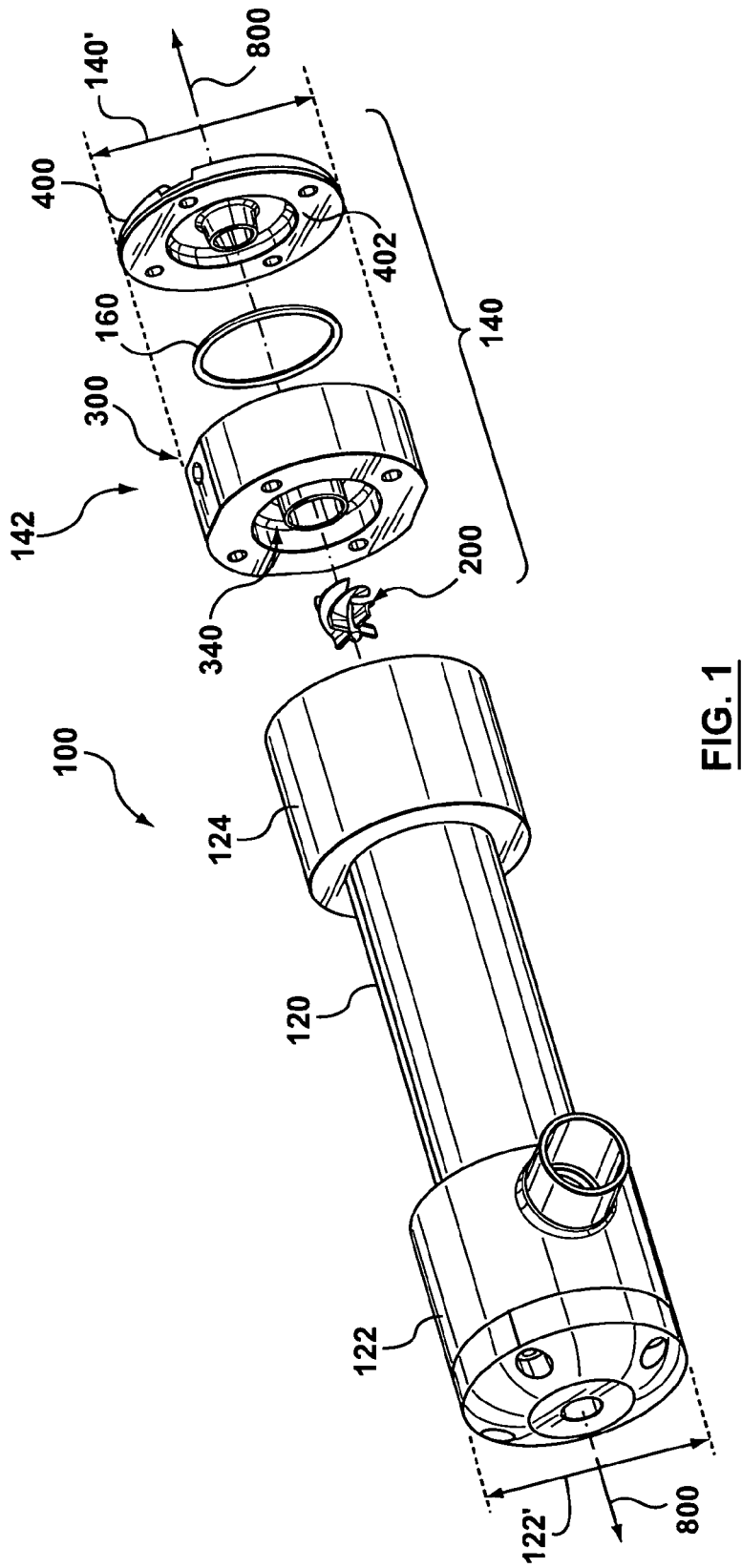
FIG. 1 is a partially exploded elevated perspective view of a liquid separator and humidifier made in accordance with the present invention.

Referring simultaneously to FIGS. 1-5, illustrated therein is a liquid separator and energy and/or mass exchange apparatus assembly, referred to generally as 100, made in accordance with the present invention. The assembly 100 includes an energy and/or mass exchanger 120 portion integrated with a separator 140 portion. In the present embodiment, the energy and/or mass exchanger 120 is a humidifier.

The humidifier body 120 is a generally cylindrical tube and includes a substantially cylindrical humidifier (or exchanger) inlet 122 and a substantially cylindrical humidifier (or exchanger) outlet 124. Typically, a substantially cylindrical desiccant cartridge 126 is provided within the body of the humidifier 120 for retaining heat and humidity therein. The cartridge 126 contains tubes 128 of desiccant material, separated by gaps or passageways 130. The humidifier also includes an end face 132 proximate the humidifier outlet 124. The humidifier 120, inlet 122, outlet 124 and desiccant cartridge 126 are substantially coaxial and aligned about a central axis shown generally as 800. Preferably the central axis 800 is substantially horizontal when the humidifier and separator assembly 100 is positioned for operational use.

The separator 140 includes a substantially cylindrical main housing 142 having a cap portion 400 and a base 300. The cap 400 is removably mounted to the base 300, typically through the use of bolts or similar retaining members passing through through-holes 306. An O-ring 160 or other type of seal may be provided between the base 300 and the cap 400 to prevent fluid leaks.

For most low-pressure applications, the housing 142 may be made of plastic or other suitable material.

A mounting face 302 is provided at one end of the separator base 300. The mounting face 302 is configured for directly mating the separator 140 to the humidifier's end face 132. As a result, no tubular extension portion for mounting a hose or other conduit to the humidifier's outlet end 124 is required. Preferably, the diameter 302' of the mounting face 302 is substantially similar to the diameter of the humidifer's end face 132. Similarly, as can be seen in FIG. 1, preferably the outer diameter 140' of the separator body 140 is substantially similar to the outer diameter 124' of the humidifier's outlet 124 (and the outer diameter 122' of the humidifier's inlet 122).

An annular inlet chamber 340 is provided in the base 300, proximate the mounting face 302. To accommodate the flow of fluid through the gaps 130 between the desiccant tubes 128 and into the inlet chamber 340, preferably the outer diameter 340' of the inlet chamber 340 is at least as great as the outer diameter 126' of the desiccant cartridge 126.

A generally cylindrical inlet channel 320 is centrally disposed within and recessed slightly from the mounting face 302 and configured for communicating a fluid stream (typically comprising water droplets and oxygen or hydrogen as a process gas) from a first inlet end 327 to a second inlet end 329 proximate a separation chamber 330. The separation chamber 330 is substantially cylindrical and is formed within an interior region of the housing 142, when the base 300 and cap 400 are mounted together.

Figure 6:
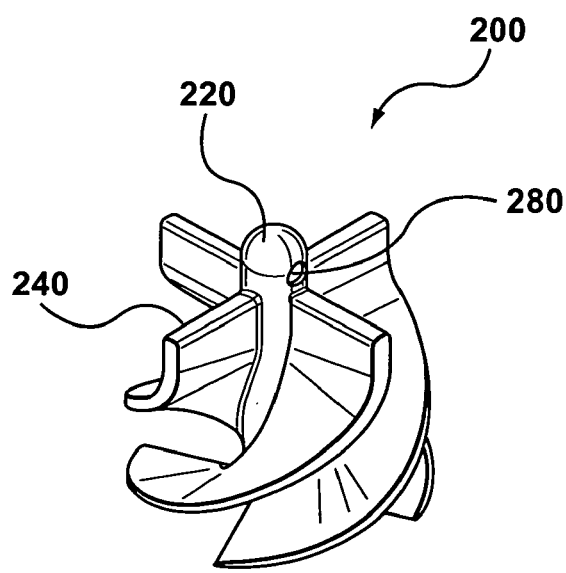
FIG. 6 is a top perspective view of the swirler of the liquid separator of FIG. 1.

A swirler 200 removably mounted within the inlet channel 320. As shown in FIG. 6, the swirler 200 is substantially propeller-shaped, having a plurality of arcuate vanes 240, spiraling about an axial shaft 220. A pin hole 280 may be provided through the axial shaft 220, to receive a pin or similar device for releasably mounting the swirler 200 to the inlet channel 320. Having a removable swirler 200 facilitates maintenance and cleaning of the separator 140.

Figure 2:
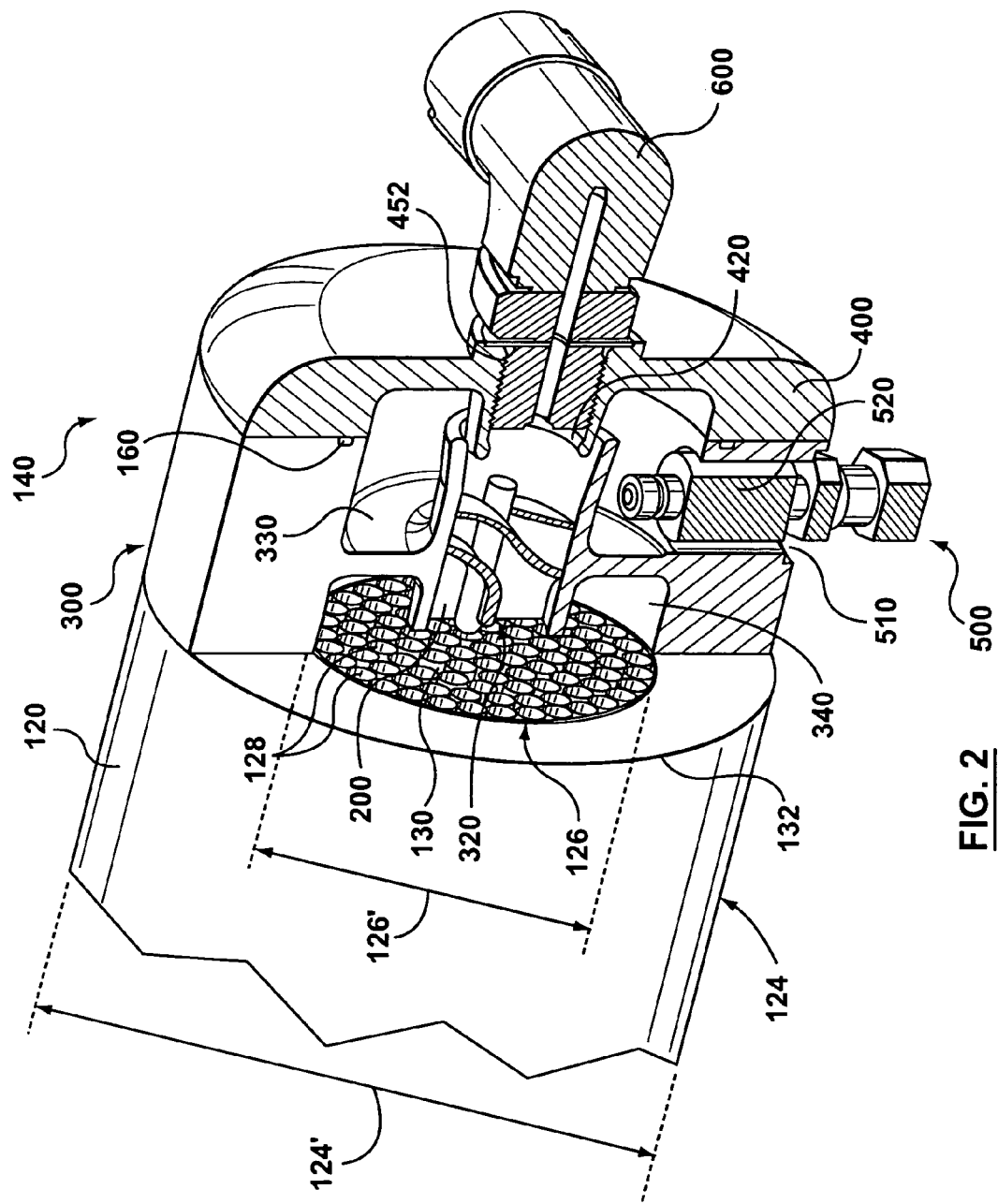
FIG. 2 is a side cutaway view of the liquid separator of FIG. 1.
Figure 3:
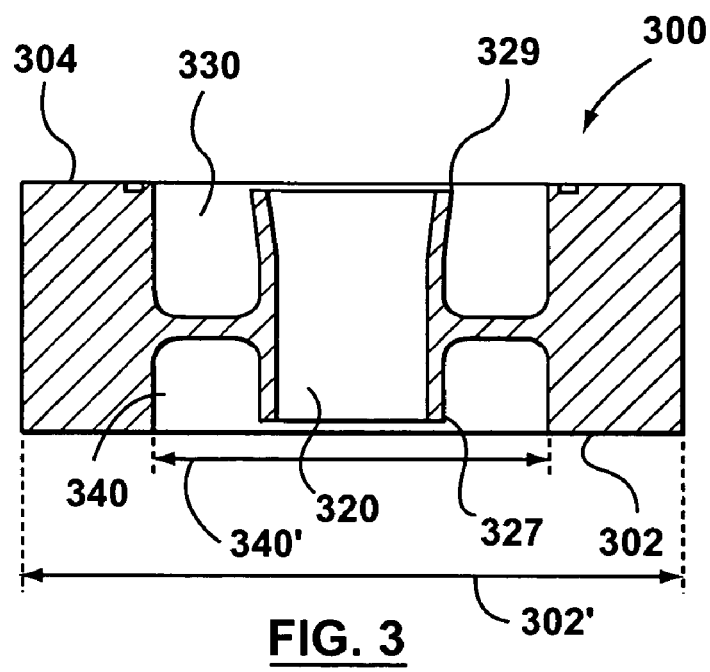
FIG. 3 is a side cutaway view of the base of the liquid separator of FIG. 1.
Figure 4:
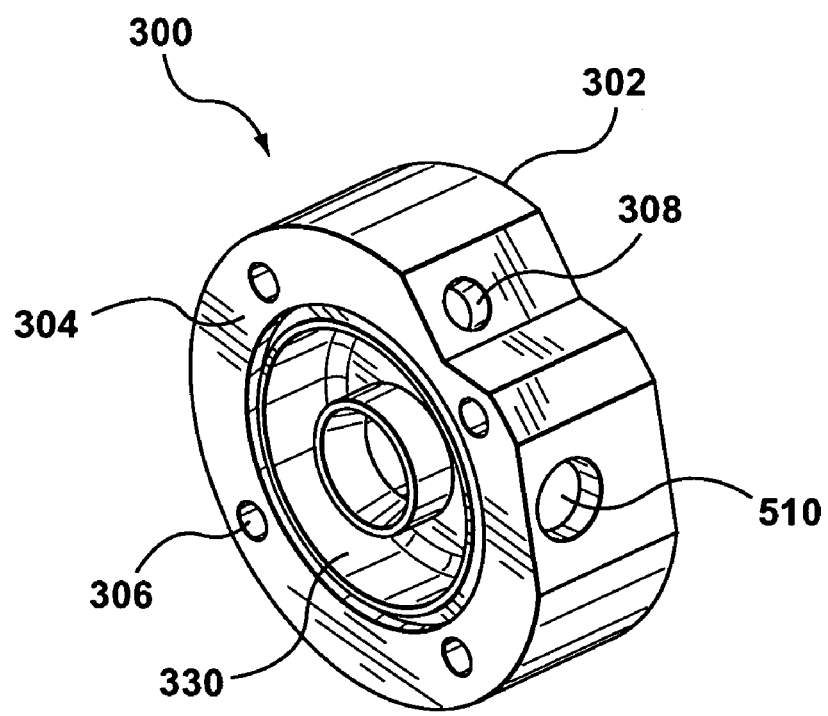
FIG. 4 is a generally bottom perspective view of the base of the liquid separator of FIG. 1.
Figure 5A:
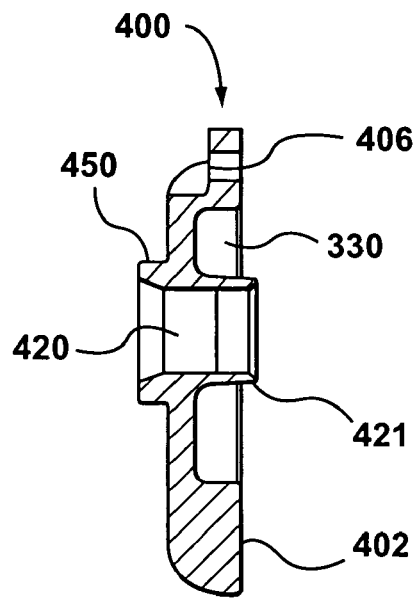
FIG. 5A is a side cutaway view of the cap of the liquid separator of FIG. 1.
Figure 5B:
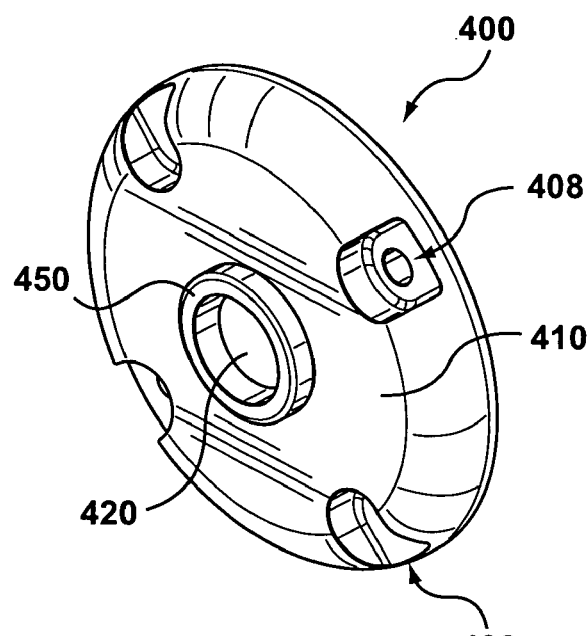
FIG. 5B is a rear perspective view of the cap of the liquid separator of FIG. 1.

As can be seen in FIG. 2, proximate the swirler 200, the inlet channel 320 begins to taper radially outwardly, such that the cross-sectional diameter of the channel 320 is larger at the second inlet end 329 than the cross-sectional diameter of the channel 320 proximate the swirler 200. The tapered portion of the channel 320 is substantially frusto-conical.

A generally tubular outlet channel 420 is formed through the cap 400, and communicates fluids between a first outlet end 421 positioned proximate the second inlet end 329, and a second outlet end 450 remote from the separation chamber 330. The outlet channel 420 forms a fluid communication between the separation chamber 330 and the exterior of the housing 142.

The first outlet end 421 is slightly inset within and generally axially aligned with the second inlet end 329. The overlapping portions of the inlet channel 320 and outlet channel 420 form an annular space or gap therebetween, through which the fluid is permitted to flow. Preferably, the inlet chamber 340, inlet channel 320, swirler 200, separation chamber 330, and outlet channel 420 are substantially coaxially aligned about the central axis 800.

The cap 400 has a cap end face 402 adapted to engage the second end face 304 of the base 300. A plurality of recesses 408 are provided on the cap's 400 external face 410. The recesses 408 are distributed around the circumference of the cover body 410. Each of the recesses 408 is provided with a through-hole 406 for accommodating screws or bolts to fix the cap 400, the base 300 and the humidifier 120 together. The through-holes 406 extend along the axial direction of the cover 400. It can be appreciated that the positions of the recesses 408 and their associated through holes 406 correspond to those of the through holes 306 in the base 300.

The exterior second outlet end 450 may be configured for connection to a hose or other suitable conduit or external fitting for delivering the fluid stream to its desired destination. Alternatively, the inner wall of the outlet channel 420 may have a threaded portion 452 for threadedly engaging a fitting 600. However, the connection between outlet channel 420 and external fittings can vary according to particular applications.

A drain 500 is provided proximate a lowest point of and in fluid communication with the separation chamber 330. In the illustrated embodiment, the lowest points of the separation chamber 330 (and correspondingly the location of the drain 500) lie beneath the central axis 800. The drain 500 includes a substantially vertical drain passageway 510 for evacuating out of the separation chamber 330 liquid which has been separated from the fluid stream. The drain 500 may also be provided with a level switch 520 mounted in the drain passageway 510 for automatically initiating draining when the separated liquid has reached a pre-determined level in the separation chamber 330.

Optionally, other through-holes, such a through hole 308 can be provided in the base 300, connecting the separation chamber 330 to external hoses for other purposes. For example, the through hole 308 can be used to direct a portion of the fluid stream outside of the separator 140.

In use, a fluid stream formed of a combination of gas and liquid droplets are directed typically under low pressure (eg. 3-10 psi) into the humidifier inlet 122, through the air gaps 130 between the desiccant tubes 128 and out the humidifier outlet 124.

The fluid stream then enters the inlet chamber 340 prior to entering the first inlet end 327 of the inlet channel 320. The fluid stream passes over the vanes 240 of the swirler 200, causing the fluid stream to swirl radially outwardly in cyclonic fashion and against the interior surface of the inlet channel 320, before emerging into the separation chamber 330 and against the interior surface of the chamber 330.

As will be understood, the spinning motion imparted to the fluid stream creates centrifugal forces which cause the water droplets to impinge upon and collect against the interior surfaces of the inlet channel 320 and the separation chamber 330. Liquid droplets collecting within the inlet channel 320 are urged by the flow of the fluid stream into the separation chamber 330.

As liquid collects in the separation chamber 330, gravity draws the liquid downwards to the chamber's 330 lowest points near the drain 500. Once a sufficient amount of separated liquid has collected at the bottom of the chamber 330, the level switch 520 is activated and allows the liquid to exit from the chamber 330 through the drain passageway 510.

The fluid stream (with at least some and preferably most of the liquid removed) is then able to enter the outlet channel 420 via the first outlet end 421 and exit the separation chamber 330 ultimately exit the outlet channel 420 and the separator 140 through the second outlet end 450.

As noted previously, the housing 142 for the separator 140 preferably includes a base 300 and a cap 400 which is removably mountable to the base 300. Such a design facilitates the cleaning and maintenance of the separator 140, generally. Preferably, upon removal of the cap 400, the inlet and outlet channels 320, 420, the separation chamber 330 and the drain 500 may be easily accessed for cleaning or maintenance.

Thus, while what is shown and described herein constitute preferred embodiments of the subject invention, it should be understood that various changes can be made without departing from the subject invention, the scope of which is defined in the appended claims.

The invention claimed is:

1. A liquid separator configured to separate liquid from a fluid stream, in combination with an energy and mass exchanger, the separator comprising:
   a) a housing;
   b) a separation chamber disposed within the housing;
   c) a drain having a drain passageway for draining liquid from the separation chamber;
   d) an inlet chamber configured to receive the fluid stream;
   e) a separator mounting face proximate the inlet chamber, for mounting the separator to an energy and mass exchanger, wherein the inlet chamber is recessed from the mounting face;
   f) an inlet channel having a first inlet end and a second inlet end, and configured to communicate the fluid stream from the inlet chamber through the first and second ends thereof to the separation chamber;
   g) a swirler disposed within the inlet channel;
   h) an outlet channel configured to communicate the fluid stream from a first outlet end positioned proximate the second inlet end, to a second outlet end remote from the separation chamber;
   wherein the exchanger comprising:
   i) an exchanger inlet;
   j) an exchanger outlet;
   k) an end face proximate the exchanger outlet, wherein the end face is configured to mate with the separator mounting face, and
   wherein the exchange apparatus and the separator are substantially aligned about a central axis.

2. The liquid separator as claimed in claim 1, wherein separation chamber is substantially cylindrical.

3. The liquid separator as claimed in claim 1, wherein the drain is positioned proximate a lowest point of the separation chamber.

4. The liquid separator as claimed in claim 1, wherein the inlet channel is of circular cross-section and flares radially outwardly proximate the second inlet end such that the diameter of the inlet channel at the second inlet end is larger than the diameter of the inlet channel proximate the swirler.

5. The liquid separator as claimed in claim 1, wherein the housing includes a base and a cap which is removably mountable to the base.

6. The liquid separator as claimed in claim 5, wherein the outlet channel passes through the cap.

7. The liquid separator as claimed in claim 1, wherein the inlet channel is substantially aligned about a central axis.

8. The liquid separator as claimed in claim 1, wherein the inlet channel, the outlet channel and the separation chamber are substantially coaxial.

9. The liquid separator as claimed in claim 1, wherein the exchanger apparatus is a humidifier.

10. A humidifier integrated with a liquid separator, wherein the separator comprises:
   a) a housing;
   b) a separation chamber disposed within the housing;
   c) a drain having a drain passageway for draining liquid from the separation chamber;
   d) an inlet chamber configured to receive the fluid stream;
   e) a mounting face proximate and around the inlet chamber;
   f) an inlet channel having a first inlet end and a second inlet end, and configured to communicate the fluid stream from the inlet chamber, through the first and second inlet ends thereof, to the separation chamber;
   g) a swirler disposed within the inlet channel; and
   h) an outlet channel configured to communicate the fluid stream from a first outlet end positioned proximate the second inlet end, to a second outlet end remote from the separation chamber; and wherein the humidifier comprises:

i) a humidifier inlet;
j) a humidifier cartridge with one end thereof connected to the humidifier inlet and providing humidification of gas flow therethrough;
k) a humidifier outlet formed by another end of the humidification cartridge;
l) an end face proximate and around the humidifier outlet, wherein the end face is configured to mate with the separator mounting face, wherein the end face is mounted to the separator mounting face, whereby gas flow out of the humidification cartridge flows through the humidifier outlet directly into the inlet chamber.

11. The humidifier integrated with a liquid separator as claimed in claim 10, wherein the humidifier and the separator are substantially aligned about a central axis.

12. The humidifier integrated with a liquid separator as claimed in claim 10, wherein the separator housing is substantially cylindrical and comprises a separator outer diameter, and wherein the humidifier outlet is substantially cylindrical and comprises an outlet outer diameter.

13. The humidifier integrated with a liquid separator as claimed in claim 12, wherein the separator outer diameter and the outlet outer diameter are substantially the same.

14. The humidifier integrated with a liquid separator as claimed in claim 13, wherein the humidifier inlet is substantially cylindrical and comprises an inlet outer diameter and wherein the inlet outer diameter is substantially the same as the outlet outer diameter.

15. The humidifier integrated with a liquid separator as claimed in claim 9, wherein the humidifier comprises a substantially cylindrical desiccant cartridge having a desiccant outer diameter and wherein the inlet chamber is substantially cylindrical and comprises a chamber outer diameter and wherein the chamber outer diameter is at least as large as the desiccant outer diameter.

* * * * *